(12) United States Patent
Namgung

(10) Patent No.: US 6,808,042 B2
(45) Date of Patent: Oct. 26, 2004

(54) ELECTRIC POWER STEERING APPARATUS FOR A VEHICLE

(75) Inventor: Joo Namgung, Wonju (KR)

(73) Assignee: Mando Corporation, Kyunggi-do (KR)

( * ) Notice: Subject to any disclaimer, the term of this patent is extended or adjusted under 35 U.S.C. 154(b) by 37 days.

(21) Appl. No.: 10/308,857

(22) Filed: Dec. 3, 2002

(65) Prior Publication Data

US 2004/0016592 A1 Jan. 29, 2004

(30) Foreign Application Priority Data

Jul. 29, 2002 (KR) .................................... 2002-0044564

(51) Int. Cl.$^7$ ................................................ B62D 5/99
(52) U.S. Cl. .................... 180/444; 180/443; 74/388 PS
(58) Field of Search ................. 180/443–446; 74/388 PS; 403/109.1, 110, 335; 384/42

(56) References Cited

U.S. PATENT DOCUMENTS 6,041,885 A * 3/2000 Watanabe et al. ........... 180/444
6,041,886 A * 3/2000 Nakaishi et al. ............ 180/444
6,418,808 B1 * 7/2002 Kishizawa .............. 74/388 PS

* cited by examiner

Primary Examiner—Lesley D. Morris
Assistant Examiner—L. Lum
(74) Attorney, Agent, or Firm—R. Neil Sudol; Henry D. Coleman; William J. Sapone

(57) ABSTRACT

A vehicular electric power steering apparatus with an enhanced supporting structure for improving the bending strength of a rack bar includes a motor having a rotor, a stator and a motor shaft inside the same; a housing installed such that it can communicate with the motor; a rack bar installed inside of the motor and housing and having a ball screw installed at the outer circumferential surface of one end and a rack gear formed at the outer circumferential surface of the other end; a ball nut installed at the outside of the ball screw for supporting the rack bar at a first point and moving the same in the axial direction; and a rack guide installed at the inside of the housing for supporting the rack bar at a second point and guiding axial movement by enclosing the rear surface of the rack gear, where the rack bar is supported at a third point by a supporting bush disposed at the inside of the front end of the housing adjacent to the rack guide.

3 Claims, 6 Drawing Sheets

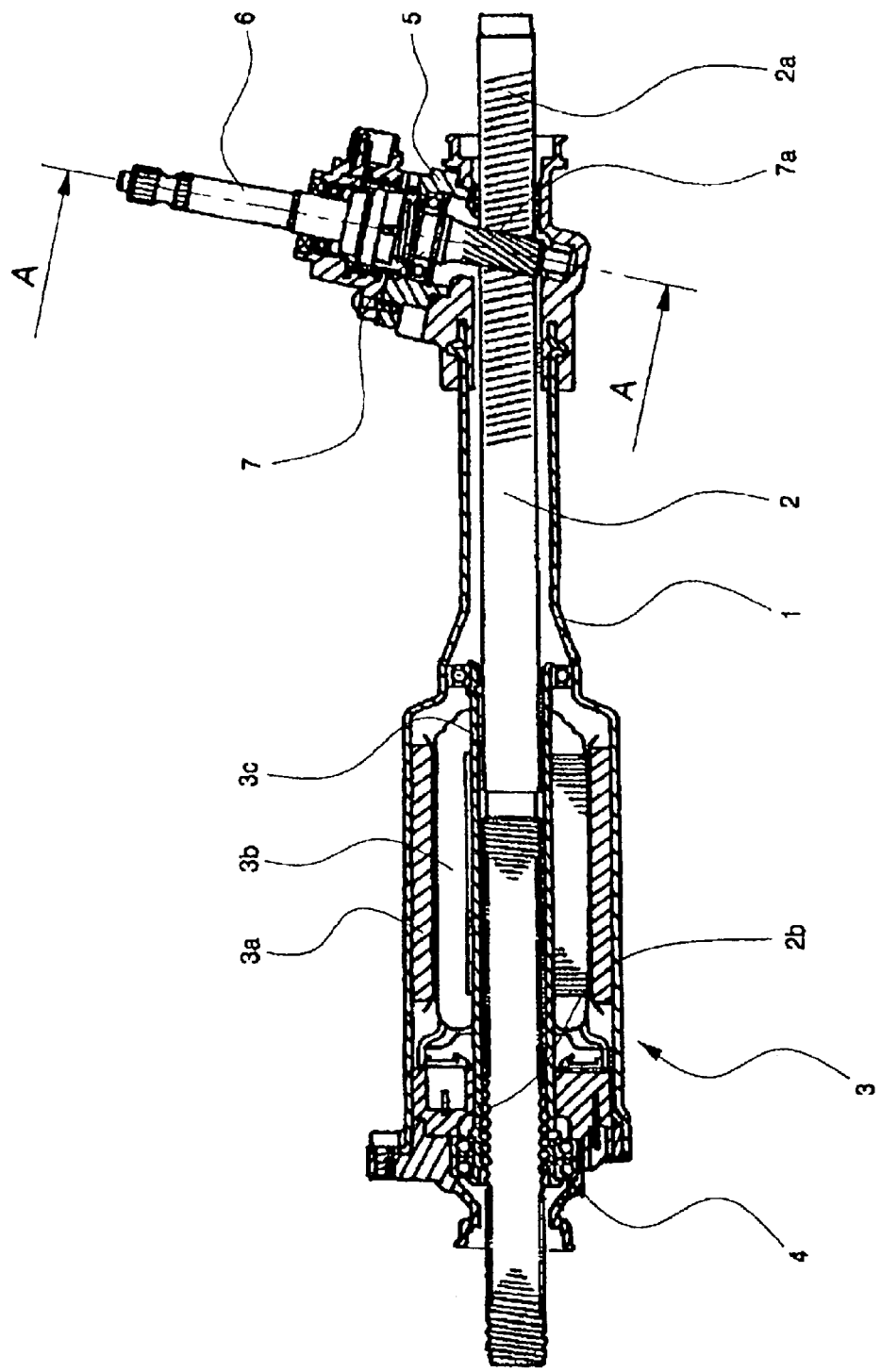
[Fig. 1] Prior Art

[Fig.2] Prior Art
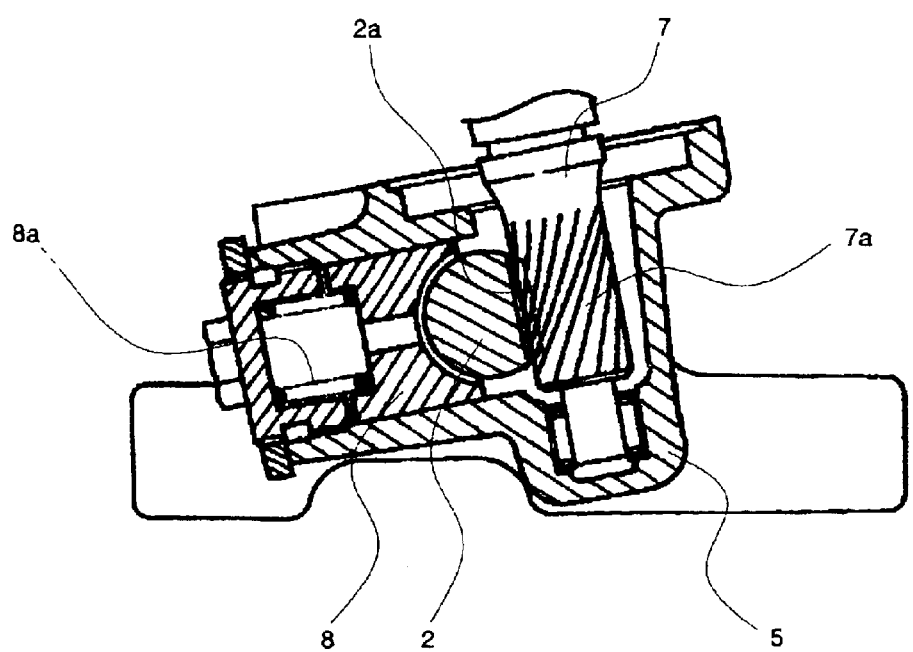
A-A cross-sectional view

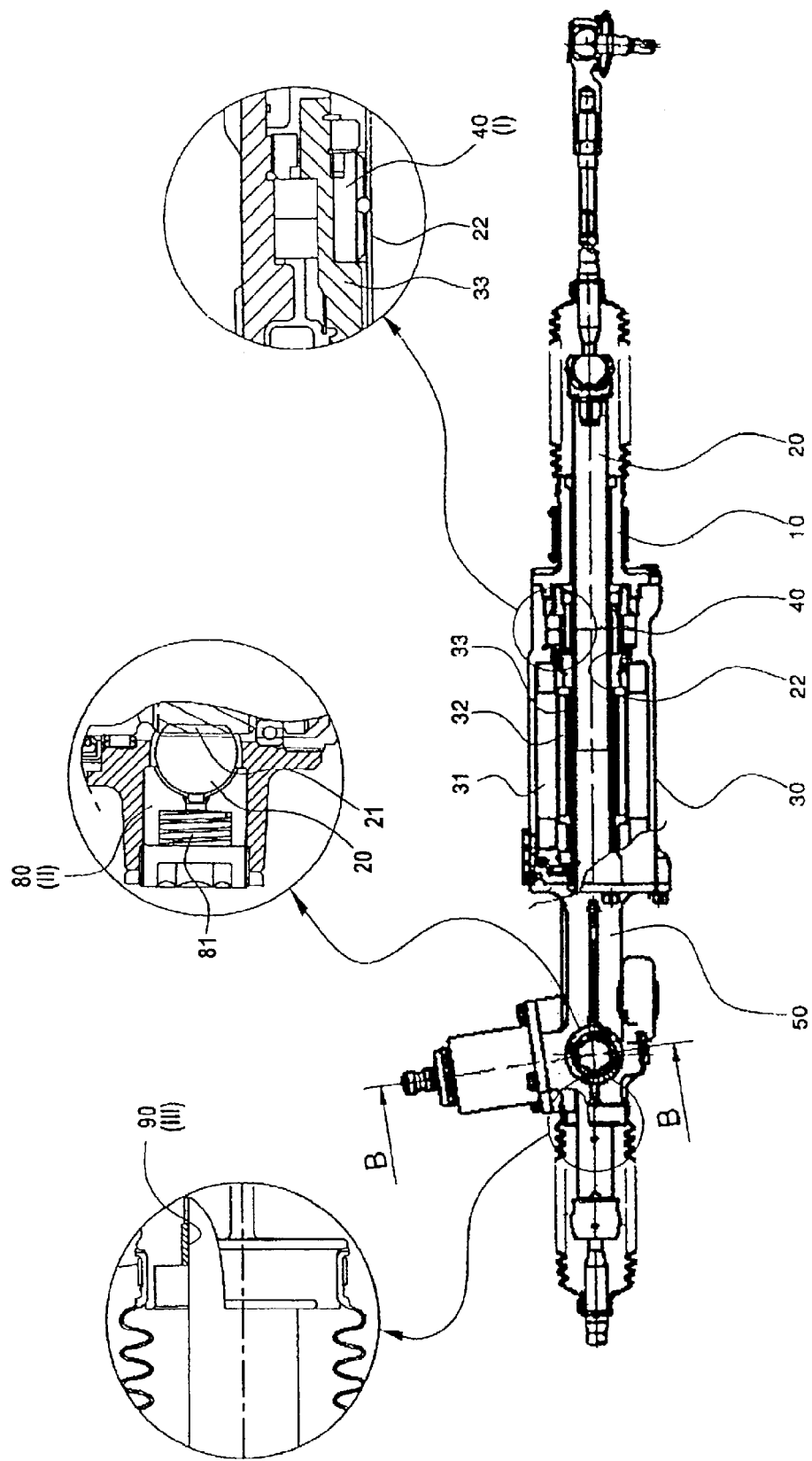
[Fig. 3]

[Fig.4]
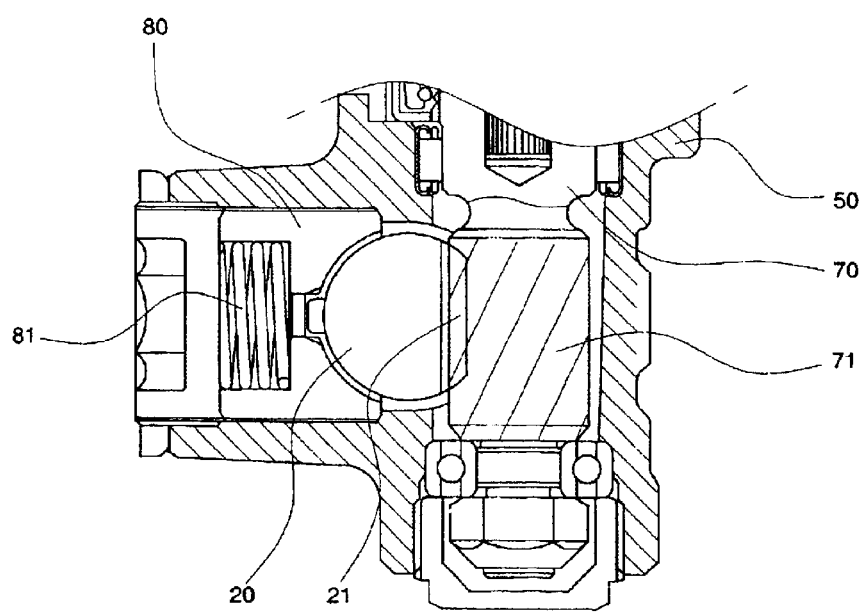
B-B cross-sectional view

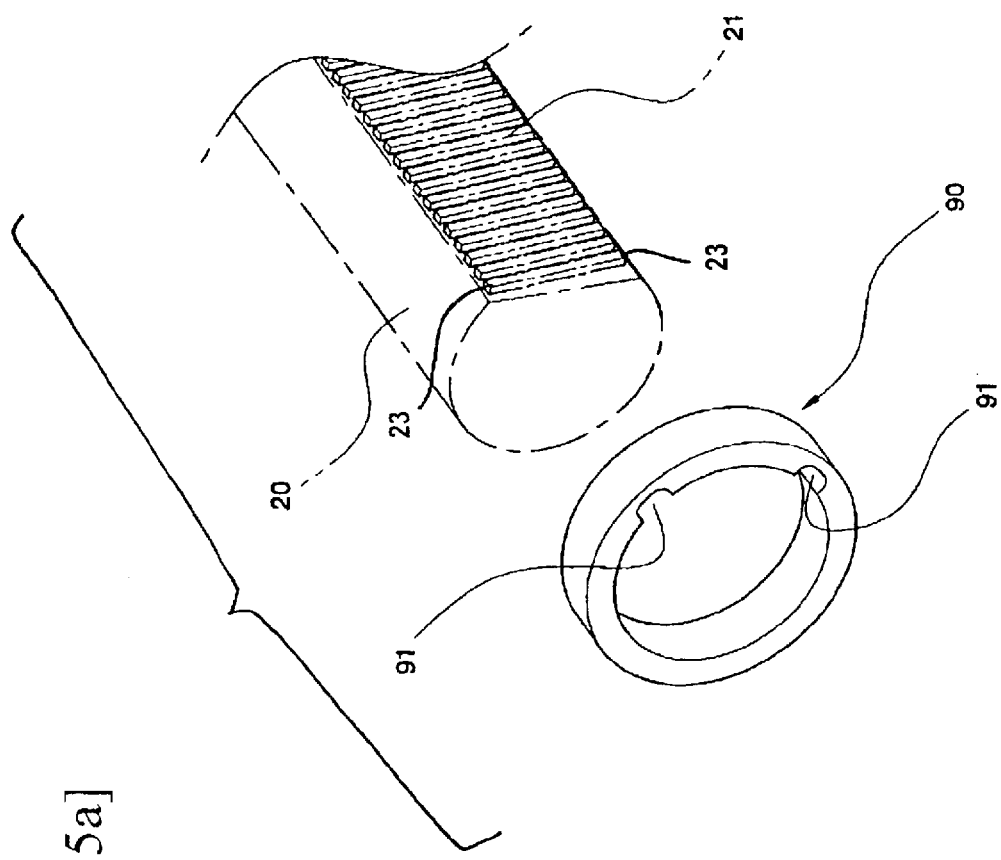
[Fig. 5a]

[Fig. 5b]
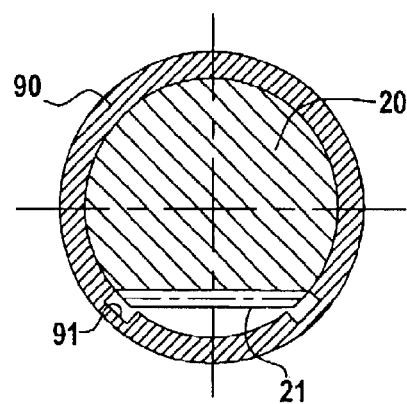

ELECTRIC POWER STEERING APPARATUS FOR A VEHICLE

BACKGROUND OF THE INVENTION

1. Field of the Invention

The present invention relates to an electric power steering apparatus for a vehicle, and more particularly, to an electric power steering apparatus for a vehicle which has an enhanced supporting structure for improving the bending strength of a rack bar.

2. Description of the Related Art

Typically, power steering apparatuses are divided into hydraulic power steering apparatuses using a hydraulic power and electric power steering apparatuses using an electric power based on the type of a power source.

Particularly, there are various kinds of electric power steering based on the installation position of a motor supplying a power. Among them, the apparatus driving a rack bar by a motor is a rack assist type electric power steering apparatus (R-EPS).

FIGS. 1 and 2 are cross sectional views showing a conventional rack assist type electric power steering apparatus. The structure thereof will be explained as follows.

That is, a rack bar 2 is contained in a rack housing 1. At the interior of one side of the rack housing 1 is installed a motor 3 with a stator 3a, a rotor 3b and a motor shaft 3c.

At the interior of the motor shaft 3c is fixed a ball nut 4. On an outer surface of the rack bar 2 disposed inside of the ball nut 4 is formed a ball screw 2b engaged with the ball nut 4.

Meanwhile, at the other side of the rack housing 1 spaced from the installation position of the ball nut 4 is installed a pinion housing 5. Inside of the pinion housing 5 is installed a pinion shaft meshing with the rack bar 2.

On an outer surface of the pinion shaft 7 and the rack bar 2 are formed a pinion gear 7a and a rack gear 2a respectively. At the backward portion of the rack gear 2a are installed a rack guide 8 and a spring 8a.

However, such a conventional electric power steering apparatus for a vehicle has a two-point support structure where both ends of the rack bar are supported by the ball nut and the rack guide. Therefore, it has a low bending strength and thus a large bending amount. This causes a rack gear portion, which is a relatively weak, to be easily damaged.

SUMMARY OF THE INVENTION

Therefore, it is an object of the present invention to provide an electric power steering apparatus for a vehicle which has a supporting bush installed in the position adjacent to a rack bar in order to improve the bending strength of a rack gear formed at the rack bar.

To achieve the above object, there is provided an electric power steering apparatus for a vehicle in accordance with the present invention, which comprises: a motor having a rotor, a stator and a motor shaft inside the same; a housing installed such that it can communicate with the motor; a rack bar installed inside of the motor and housing and having a ball screw installed at the outer circumferential surface of one end and a rack gear formed at the outer circumferential surface of the other end; a ball nut installed at the outside of the ball screw for supporting the rack bar at a first point and moving the same in the axial direction; and a rack guide installed at the inside of the housing for supporting the rack bar at a second point and guiding axial movement by enclosing the rear surface of the rack gear, where the rack bar is supported at a third point by a supporting bush disposed at the inside of the front end of the housing adjacent to the rack guide In a preferred embodiment of the present invention, at the inner circumferential surface of the supporting bush, a clearance recess for separating the edge of the rack gear from the inner circumferential surface of the supporting bush may be formed, in order to prevent abrasion caused by the friction between the supporting bush and the rack gear.

Preferably, the clearance recess may be formed along the circumferential direction of the rack gear as much as the number of edges of the rack gear.

And, the housing may include a first housing and a second housing installed such that they can communicate with both ends of the motor.

Further, the housing is installed to communicate with one end of the motor at a pinion side and the housing of the motor can be formed integrally with the other end of the motor.

BRIEF DESCRIPTION OF THE DRAWINGS

The above objects, features and advantages of the present invention will become more apparent from the following detailed description when taken in conjunction with the accompanying drawings, in which:

FIG. 1 is a longitudinal sectional view showing a conventional electric power steering apparatus;

FIG. 2 is a cross sectional view showing the apparatus of FIG. 1 taken along line A—A;

FIG. 3 is a side elevational view broken away to include a partial longitudinal sectional view showing an electric power steering apparatus in accordance with the present invention. FIG. 3 includes three detailed views on a larger scale, a left-most detail view being partially elevational and partially cross-sectional and showing in cross-section one side of a support bush of a three-point rack support arrangement in accordance with the present invention.

FIG. 4 is a cross sectional view showing the apparatus of FIG. 3 taken along line A—A; and FIG. 5a is a perspective view showing a bush in accordance with the present invention.

FIG. 5b is a transverse cross-sectional view showing the bush and rack bar of FIG. 5a.

DETAILED DESCRIPTION OF THE PREFERRED EMBODIMENTS

A preferred embodiment of the present invention will now be described with reference to the accompanying drawings.

As illustrated in FIG. 3, a motor housing 30 is installed at one end of an end housing 10, which a rack bar 20 is inserted into, such that it can communicate with the end housing 10. At the interior of the motor housing 30 are installed a stator 31, a rotor 32 and a motor shaft 33.

At the interior of the motor shaft 33 is fixed a ball nut 40 having a spiral recess with a hemispherical section and a ball inserted thereinto at the inner circumferential surface. At an outer surface of the rack bar 20 disposed inside of the ball nut 40 is formed a ball screw 22 of a spiral recess shape that is to be engaged with the ball nut 40.

Moreover, at the other end of the motor housing 30 spaced from the installation position of the ball nut 40 is installed a pinion housing 50. As shown in FIG. 4, a pinion shaft 70, which is to be connected to a steering shaft (not shown), is installed at the interior of the pinion housing 50, meshing with the rack bar 20.

Further, at an outer surface of the pinion shaft 70 and the rack bar 20 are formed a pinion gear 71 and a rack gear 21 respectively. At the backward portion of the rack gear 21 are installed a rack guide 80 and a spring 81 which enclose the rack bar 20 for thereby elastically supporting it in the direction of the pinion shaft 70.

Meanwhile, in the present invention, for improving the bending strength of the rack bar 20 with both ends being supported at two points by the ball nut 40 and the rack guide 80, a supporting bush 90 as shown in FIG. 5 is installed at the front end of the pinion housing 50 adjacent to the rack guide 80 in order to support the rack bar 20 at three points.

That is, in order to prevent the rack gear 21 at the rack guide 80 functioning as a one-side supporting point of the rack bar 20 from being damaged by a relatively low bending strength as compared to other elements, the supporting bush 90 is provided outwardly in the axial direction of the rack gear 21.

At this time, as illustrated in FIG. 5, the supporting bush 90 is a ring-shaped bush that is provided to support the rack bar 20. Its outer circumferential surface is provided to be fixed at the interior of the pinion housing 50 by press fitting and it inner circumferential surface is provided to be closely contacted with the outer circumferential surface of the rack bar 20 for thereby supporting the rack bar 20.

Further, in order to prevent an abrading friction from occurring between an edge 23 formed at the rack gear 21 of the rack bar 20 in the circumferential direction and the inner circumferential surface of the supporting bush 90, a clearance recess 91 for separating the edge 23 of the rack gear from the inner circumferential surface of the supporting bush 90 is provided at the inner circumferential surface of the supporting bush 90. This clearance recess 91 is formed along the circumferential direction of the rack gear 21 at as many locations (e.g. two) as the number of edges 23 of the rack gear 21.

In the thusly constructed electric power steering apparatus for a vehicle in accordance with the present invention, when a power is applied to the motor 30, the rotor 32, motor shaft 33 and ball nut 40 are rotated in the stator 31. Resultantly, a ball performs a rolling movement between the ball nut 40 and the ball screw 22, thereby moving the rack bar 20 in the axial direction.

At this time, since the rack bar 20 is supported at three points by the supporting bush 90, the ball nut 40 and the rack guide 80 installed therebetween, the bending strength thereof is improved and thus the bending volume is reduced, thereby enabling a smooth axial movement.

Furthermore, since the clearance recess 91 is formed at the inner circumferential surface of the supporting bush 90, this can prevent a friction and abrasion between the supporting bush 90 and the rack gear 21, thereby making the axial movement of the rack bar 20 performed in a smoother way.

As described above in detail, the electric power steering apparatus for a vehicle of the present invention can prevent the deformation of the rack bar because the bending strength of the rack bar is improved by supporting the rack bar at three points. Particularly, the apparatus can prevent the damage of the rack gear which is a relatively weak.

Moreover, two clearance recesses for separating the edge from the inner circumferential surface of the supporting bush are prepared at the inner circumferential surface of the supporting bush, for thereby preventing the friction between the supporting bush and the rack gear and the resulting abrasion and enhancing the reliability of the product.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An electric power steering apparatus for a vehicle, comprising:

a motor having a rotor, a stator and a motor shaft inside the same;

a housing installed such that it can communicate with the motor;

a rack bar installed inside of the motor and housing and having a ball screw installed at an outer circumferential surface of one end and a rack gear formed at an outer circumferential surface of the other end;

a ball nut installed at the outside of the ball screw for supporting the rack bar at a first point and moving the rack bar in the axial direction; and a rack guide installed at the inside of the housing for supporting the rack bar at a second point and guiding axial movement by enclosing a rear surface of the rack gear, wherein said rack bar is supported at a third point by a supporting bush disposed inside of a front end of the housing adjacent to the rack guide, wherein at an inner circumferential surface of the supporting bush, a clearance recess is provided for separating an edge of the rack gear from the inner circumferential surface of the supporting bush, in order to prevent abrasion caused by friction between the supporting bush and the rack gear.

2. The electric power steering apparatus for a vehicle of claim 1, wherein said rack gear has a number of edges and wherein said clearance recess is one of a number of clearance recesses formed along a circumferential direction of the rack gear, the number of clearance recesses being the same as the number of edges of the rack gear.

3. The electric power steering apparatus for a vehicle of claim 1, wherein said housing is installed to communicate with one end of the motor at a pinion side and to be formed integrally with the other end of the motor.

* * * * *